United States Patent [19]
Haddad et al.

[11] Patent Number: 5,158,919
[45] Date of Patent: Oct. 27, 1992

[54] CATALYST REGENERATION IN A SINGLE STAGE REGENERATOR CONVERTED TO A TWO STAGE HIGH EFFICIENCY REGENERATOR

[75] Inventors: James H. Haddad, Princeton Junction; Hartley Owen, Belle Mead; Mark S. Ross, Lawrenceville, all of N.J.

[73] Assignee: Mobil Oil Corporation, Fairfax, Va.

[21] Appl. No.: 693,253

[22] Filed: Apr. 29, 1991

[51] Int. Cl.[5] .................. B01J 38/32; B01J 38/34; B01J 21/20; C10G 11/18

[52] U.S. Cl. .................. 502/44; 34/57 A; 208/113; 208/164; 422/144; 502/40; 502/42; 502/43

[58] Field of Search .................. 502/40-44; 208/164, 153

[56] References Cited

U.S. PATENT DOCUMENTS

| | | | |
|---|---|---|---|
| 2,719,111 | 9/1955 | Adams et al. | 502/41 |
| 3,440,020 | 4/1969 | Owen | 208/153 |
| 3,661,800 | 5/1972 | Pfeiffer et al. | 252/417 |
| 4,038,038 | 7/1977 | Bunn, Jr. et al. | 23/288 |
| 4,118,338 | 10/1978 | Gross et al. | 252/417 |
| 4,272,402 | 6/1981 | Mayes | 502/40 |
| 4,356,082 | 10/1982 | Gross | 208/164 |
| 4,959,334 | 9/1990 | Mauleon et al. | 502/43 |
| 4,991,521 | 2/1991 | Green et al. | 110/347 |

Primary Examiner—Paul E. Konopka
Attorney, Agent, or Firm—Alexander J. McKillop; Charles J. Speciale; Richard D. Stone

[57] ABSTRACT

A process and apparatus for fluidized bed catalyst regeneration. A mixture of spent catalyst, recycled hot regenerated catalyst and regeneration gas are charged to a riser having an outlet connective with a coke combustor immersed in a fluidized bed of catalyst. The coke combustor outlet is covered by the dense phase fluidized bed. Additional combustion air may be added to the fluidized bed of catalyst covering the coke combustor outlet for additional catalyst regeneration. Indirect heat exchange may heat spent catalyst in the riser and/or the coke combustor.

9 Claims, 1 Drawing Sheet

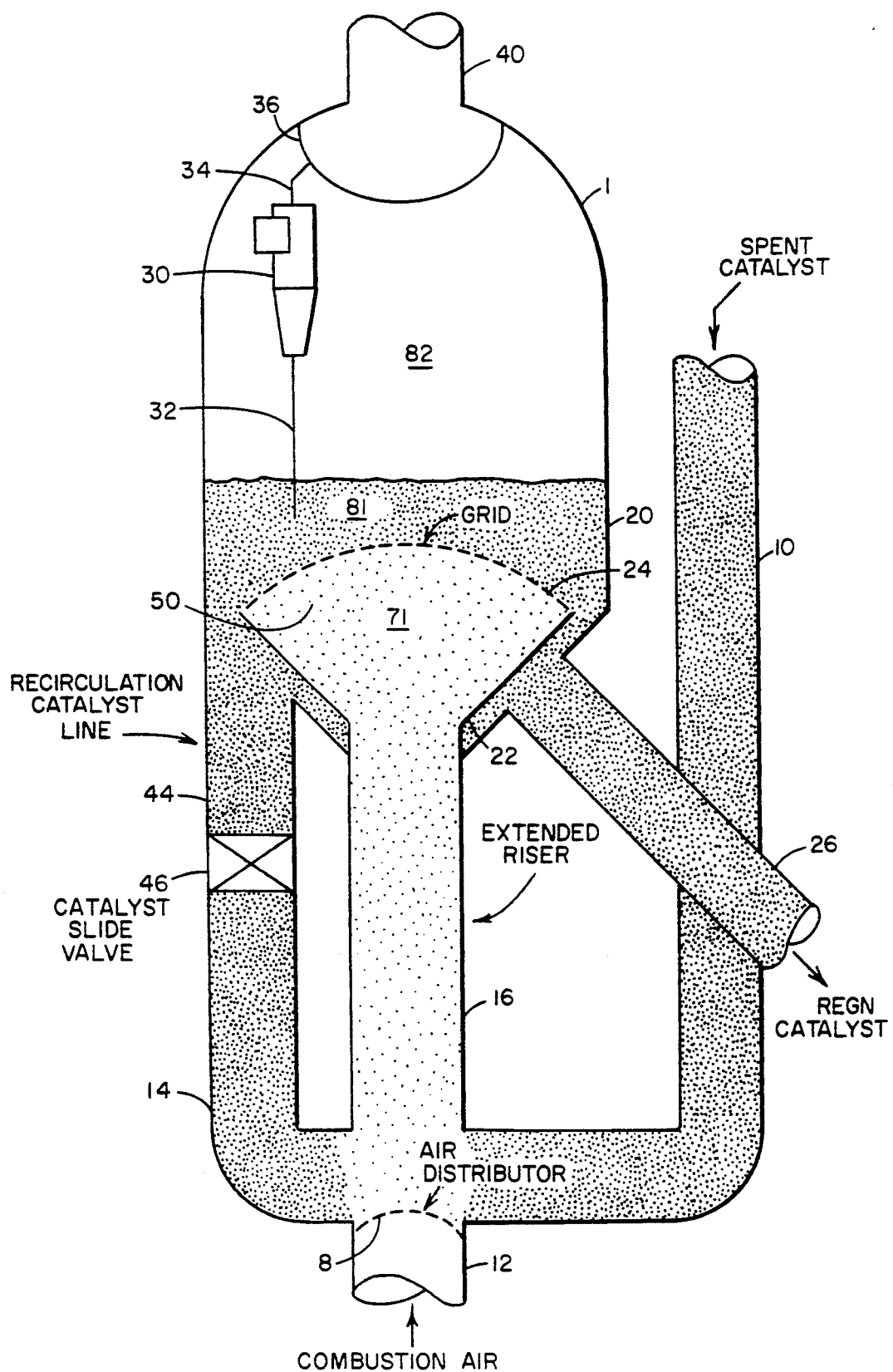

CATALYST REGENERATION IN A SINGLE STAGE REGENERATOR CONVERTED TO A TWO STAGE HIGH EFFICIENCY REGENERATOR

BACKGROUND OF THE INVENTION

1. Field of the Invention

The invention relates to the regeneration of fluidized catalytic cracking catalyst.

2. Description of Related Art

Catalytic cracking of hydrocarbons is carried out in the absence of externally supplied H2, in contrast to hydrocracking, in which H2 is added during the cracking step. An inventory of particulate catalyst is continuously cycled between a cracking reactor and a catalyst regenerator In the fluidized catalytic cracking (FCC) process, hydrocarbon feed contacts catalyst in a reactor at 425° C.–600° C., usually 460° C.–560 C. The hydrocarbons crack, and deposit carbonaceous hydrocarbons or coke on the catalyst. The cracked products are separated from the coked catalyst. The coked catalyst is stripped of volatiles, usually with steam, and is then regenerated. In the catalyst regenerator, the coke is burned from the catalyst with oxygen containing gas, usually air. Coke burns off, restoring catalyst activity and simultaneously heating the catalyst to, e.g., 500° C.–900° C., usually 600° C.–750° C. Flue gas formed by burning coke in the regenerator may be treated for removal of particulates and for conversion of carbon monoxide, after which the flue gas is normally discharged into the atmosphere.

Most older FCC units regenerate the spent catalyst in a single dense phase fluidized bed of catalyst. Although there are myriad individual variations, typical designs are shown in U.S. Pat. No. 3,849,291 (Owen) and U.S. Pat. No. 3,894,934 (Owen et al), and U.S. Pat. No. 4,368,114 (Chester et at.) which are incorporated herein by reference.

Most new units are of the High Efficiency Regenerator (H.E.R.) design using a coke combustor, a dilute phase transport riser, and a second dense bed, with recycle of some hot, regenerated catalyst from the second dense bed to the coke combustor. Units of this type are shown in U.S. Pat. No. 3,926,778 (which is incorporated by reference) and many other recent patents. The H.E.R. design is used in most new units because it permits operation of an FCC with less catalyst inventory (and hence less catalyst loss and lower catalyst makeup), and because such units tend to have both less CO emissions and less NOx emissions than the single dense bed regenerators.

Unfortunately, it has not been economically justifiable to convert older style, single dense bed regenerators to the modern H.E.R. design because of the high capital cost associated with simply scrapping the old single bed regenerator. Attempts to simply use the old single stage regenerator as part of a modern two stage, H.E.R. design have not been too successful, as the old single stage units are much larger than either of the beds in an H.E.R. unit. Another complication has been that many of the older units were not designed to operate at the higher temperatures associated with complete CO combustion.

Rather than scrap older FCC regenerators, refiners have tried to improve them, and the FCC process, as much as possible with improvements in catalyst and catalyst additives.

Most FCC units now use zeolite-containing catalyst having high activity and selectivity. These catalysts work best when the amount of coke on the catalyst after regeneration is relatively low. It is desirable to regenerate zeolite catalysts to as low a residual carbon level as is possible. It is also desirable to burn CO completely within the catalyst regenerator system to conserve heat and to minimize air pollution. Heat conservation is especially important when the concentration of coke on the spent catalyst is relatively low as a result of high catalyst selectivity. Among the ways suggested to decrease the amount of carbon on regenerated catalyst and to burn CO in the regenerator is to add a CO combustion promoter metal to the catalyst or to the regenerator. Metals have been added as an integral component of the cracking catalyst and as a component of a discrete particulate additive, in which the active metal is associated with a support other than the catalyst. U.S. Pat. No. 2,647,860 proposed adding 0.1 to 1 weight percent chromic oxide to a cracking catalyst to promote combustion of CO. U.S. Pat. No. 3,808,121, incorporated herein by reference, introduced relatively large-sized particles containing CO combustion-promoting metal into a cracking catalyst regenerator. The circulating particulate solids inventory, of small-sized catalyst particles, are cycled between the cracking reactor and the catalyst regenerator, while the combustion-promoting particles remain in the regenerator. Oxidation-promoting metals such as cobalt, copper, nickel, manganese, copper-chromite, etc. impregnated on an inorganic oxide such as alumina, are disclosed.

U.S. Pat. No. 4,072,600 and U.S. Pat. No. 4,093,535 teach combustion-promoting metals such as Pt, Pd, Ir, Rh, Os, Ru and Re in cracking catalysts in concentrations of 0.01 to 50 ppm, based on total catalyst inventory.

Many FCC units use CO combustion promoters. This reduces CO emissions, but usually increases nitrogen oxides (NOx) in the regenerator flue gas. It is difficult in a catalyst regenerator to completely burn coke and CO in the regenerator without increasing the NOx content of the regenerator flue gas.

Although many refiners have recognized the problem of NOx emissions from FCC regenerators, the solutions proposed have not been completely satisfactory. The approaches taken so far have generally been directed to special catalysts which will inhibit the formation of NOx in the FCC regenerator, or to process changes which reduce NOx emissions from the regenerator.

Recent catalyst patents include U.S. Pat. No. 4,300,997 and its division U.S. Pat. No. 4,350,615, both directed to the use of Pd-Ru CO-combustion promoter The bi-metallic CO combustion promoter is reported to do an adequate job of converting CO to CO2, while minimizing the formation of NOx.

Another catalyst development is disclosed in U.S. Pat. No. 4,199,435 which suggests steam treating conventional metallic CO combustion promoter to decrease NOx formation without impairing too much the CO combustion activity of the promoter.

Process modifications are suggested in U.S. Pat. No. 4,413,573 and U.S. Pat. No. 4,325,833 directed to two- and three-stage FCC regenerators, which reduce NOx emissions.

U.S. Pat. No. 4,313,848 teaches countercurrent regeneration of spent FCC catalyst, without backmixing, to minimize NOx emissions.

U.S. Pat. No. 4,309,309 teaches the addition of a vaporizable fuel to the upper portion of a FCC regenerator to minimize NOx emissions. Oxides of nitrogen formed in the lower portion of the regenerator are reduced in the reducing atmosphere generated by burning fuel in the upper portion of the regenerator.

U.S. Pat. No. 4,235,704 suggests that too much CO combustion promoter causes NOx formation, and calls for monitoring the NOx content of the flue gases, and adjusting the concentration of CO combustion promoter in the regenerator based on the amount of NOx in the flue gas.

The approach taken in U.S. Pat. No. 4,542,114 is to minimize the volume of flue gas by using oxygen rather than air in the FCC regenerator, with consequent reduction in the amount of flue gas produced.

All the catalyst and process patents discussed above from U.S. Pat. No. 4,300,997 to U.S. Pat. No. 4,542,114, are incorporated herein by reference.

None of the approaches described above provides the perfect solution. Various catalytic approaches, e.g., use of bi-metallic CO combustion promoters, provide some assistance, but the cost and complexity of a bi-metallic combustion promoter is necessary. The reduction in NOx emissions achieved by catalytic approaches helps some but still may fail to meet the ever more stringent NOx emissions limits set by local governing bodies. Much of the NOx formed is not the result of combustion of N2 within the FCC regenerator, but rather combustion of nitrogen-containing compounds in the coke entering the FCC regenerator. Bi-metallic combustion promoters are probably best at minimizing NOx formation from N2.

We have discovered a way to overcome many of the deficiencies of the prior art methods of regenerating spent FCC catalysts in a single dense bed by designing the regenerator so that whenever high oxygen concentrations are present, there will also be relatively high concentrations of carbonaceous particles, and usually high concentrations of CO. The presence of carbonaceous particles and/or a generally reducing atmosphere, are known to reduce the formation of NOx. Although this phenomenon is generally known, it has never been used effectively in commercial FCC regenerators, because of the difficulty of designing such a regenerator. We found a way to achieve something approaching co-current regeneration, wherein oxygen concentration can be matched to nitrogenous coke concentration, and wherein the chance of localized high temperature regions in the regenerator is greatly reduced or eliminated. This approach can best be followed by first considering an "ideal" but impractical regenerator, then the regenerator of the present invention which comes close to achieving an "ideal" regeneration, as far as NOx emissions and heat recovery are concerned.

An "ideal" but unusable regenerator would be a 500 to 1000' foot long tube, with an inlet at the base for coked catalyst and air or other gas and an outlet at the top for regenerated catalyst and flue gas. The geometry of the tube would be selected, relative to gas flow, so that dilute phase, turbulent flow would be maintained.

This is an ideal regenerator as far as NOx and heat recovery are concerned High oxygen concentrations, which would normally rapidly oxidize nitrogenous coke and tend to form NOx are balanced or offset by high coke concentrations. The presence of coke and formation of CO (from coke combustion) both suppress NOx formation or promote its reduction to nitrogen.

In the ideal regenerator there is always good contact of catalyst and flue gas, so that as things heated up, either from coke combustion, or from afterburning of CO to CO2, the catalyst particles function as efficient heat sinks. Turbulent plug flow prevents localized high concentrations of oxygen, which could give localized high temperatures and/or localized high NOx concentrations.

Use of near stoichiometric air would mean that the oxygen concentration would decrease simultaneously with coke on catalyst. Coke concentration and oxygen concentration would both decrease asymptotically. The reduced oxygen concentration would decrease coke combustion rates, but the "ideal" regenerator could be made long enough to achieve any desired degree of coke removal. NOx formed, per unit of coke burned, would drop because NOx formation is strongly influenced by oxygen concentration.

Unfortunately, this "ideal" regeneration is not achievable in commercial catalytic cracking units, where 10-100 ton per minute of catalyst must flow as a fluid between a regenerator and a reactor, which are frequently at different elevations and may be at different pressures We wanted a practical way to achieve something which approaches the above ideal regeneration.

We discovered a way to achieve almost "ideal" regeneration which could be used in new units, or even retrofitted into existing regenerators. Our new process can use the shell of a conventional bubbling bed regenerator, and much of the equipment associated with it, to achieve efficient, generally co-current regeneration of FCC catalyst.

BRIEF SUMMARY OF THE INVENTION

Accordingly, the present invention provides a three stage process for regenerating spent cracking catalyst containing nitrogen and hydrogen containing coke to produce regenerated catalyst comprising dilute phase, plug flow regeneration of spent catalyst by mixing it with a supply of hot regenerated catalyst to heat spent cracking catalyst by direct contact heat exchange and contacting said mixture in the base of a vertical riser with an oxygen or oxygen containing gas added in an amount sufficient to burn at least a majority of the coke on the spent cracking catalyst, and wherein the riser has a cross sectional area relative to gas and catalyst flow to generate a superficial vapor velocity in said riser sufficient to transport said mixture up said riser as a dilute phase to a riser outlet which discharges partially regenerated catalyst and oxygen containing flue gas; then continuous stirred tank regeneration of partially regenerated catalyst and oxygen containing flue gas discharged from said riser into an inverted cone coke combustor vessel having an inlet in a base thereof connective with said riser outlet and having a gas and catalyst permeable outlet at a top portion thereof, and said permeable outlet has a cross sectional area at least twice that of said riser outlet so that the superficial vapor velocity of partially regenerated catalyst discharged from the riser outlet is reduced at least 50% at the permeable outlet of the coke combustor, and wherein the coke combustor has a volume sufficient to provide a residence time sufficient to burn at least a majority of the hydrogen and nitrogen compounds within the coke combustor to produce flue gas and partially regenerated catalyst which are discharged up through the permeable outlet of the coke combustor; and finally dense phase fluidized bed regeneration of partially regenerated catalyst from the coke combustor in a bubbling or turbulent dense phase fluidized bed maintained in a regenerated catalyst containment vessel containing said coke combustor permeable outlet and adapted to maintain said dense bed at a depth sufficient to cover said permeable outlet and completing in said dense bed the regeneration of said spent catalyst to produce hot regenerated catalyst which is recycled to said riser inlet to heat said spent catalyst and for recycle to a catalytic cracking reactor.

In another embodiment, the present invention provides a process for regenerating spent cracking catalyst containing coke comprising nitrogen and hydrogen in a single, dense phase, bubbling or turbulent fluidized bed wherein oxygen or an oxygen containing gas is added to said bed and the coke is burned to form flue gas comprising $CO_2$, $NO_x$ and $H_2O$, and hot regenerated cracking catalyst which is recycled to a catalytic cracking process, the improvement comprising burning at least a majority of said coke in a vertical riser having a cross sectional area, a lower inlet connective with a source of spent catalyst, a source of hot, catalyst, and a source of combustion air; and an upper outlet; a coke combustor means comprising a vessel having a lower inlet portion connective with said riser outlet and an upper portion comprising a catalyst and gas permeable outlet, having an enlarged cross-sectional area relative to said riser, for discharge of catalyst and flue gas up through said permeable outlet; and burning a minority of said coke in a regenerator vessel containing said coke combustor outlet and adapted to maintain a dense phase fluidized bed of hot, regenerated catalyst at a depth sufficient to cover said coke combustor outlet, to produce regenerated catalyst in said regenerator vessel and recycling from said dense bed regenerated catalyst to said riser.

In an apparatus embodiment, the present invention provides an apparatus for the multistage regeneration of spent, fluidized catalytic cracking catalyst comprising a vertical riser having a cross sectional area and a lower inlet connective with a source of spent catalyst, a source of hot, regenerated catalyst, and a source of oxygen containing regeneration gas; and an upper outlet connective with a coke combustor means; said coke combustor means comprising a closed vessel having a lower inlet contiguous with said riser outlet and an upper outlet comprising a catalyst and gas permeable surface, having a cross-sectional area t least twice that of said riser, adapted to discharge catalyst and flue gas from said closed vessel up into a fluidized bed of catalyst in a regenerated catalyst containment vessel containing said coke combustor means and said fluidized bed; said regenerated catalyst containment vessel means comprising a vessel adapted to contain at least the outlet of said coke combustor means and maintain a fluidized bed of hot, regenerated catalyst of sufficient depth to cover the outlet of said coke combustor means, and comprising a catalyst recycle line connective with said riser inlet, a regenerated catalyst outlet line for recycle of regenerated catalyst to a catalytic cracking means, and a flue gas outlet for removal of flue gas from said regenerator vessel.

BRIEF DESCRIPTION OF THE DRAWINGS

The FIGURE is a simplified, cross-sectional view of one embodiment of the invention showing a riser mixing zone, and an extremely small coke combustor zone within a conventional single dense bed regenerator.

DETAILED DESCRIPTION

The invention can be better understood with reference to the FIGURE.

Regenerator 1 preferably uses the shell of an old style, single dense bed or swirl type regenerator. It contains a dense bed of hot, regenerated catalyst, but need not contain either a spent catalyst inlet, nor a combustion air supply.

Spent catalyst from an FCC catalyst stripper, not shown, is passed via line 10 to the base of riser mixer 16. Recycled hot regenerated catalyst is added via line 14, while combustion air is added via line 12 and optional air distributor 8 to the base of riser mixer 16. The screen or distributor 8 promotes smooth distribution of air throughout the mixture of spent and hot regenerated catalyst. The mixture of combustion air, spent and regenerated catalyst passes up through riser 16, where some regeneration of catalyst occurs. Co-current flow of combustion air and of spent catalyst promote rapid coke burning in the riser mixer. Usually the residence time in the riser mixer is so short that a majority of the coke on spent catalyst will remain on spent catalyst through the entire length of the riser mixer 16, ensuring the presence of carbonaceous particles to suppress $NO_x$ formation, or reduce it, if formed. Partially regenerated, catalyst is discharged from riser section 16 into transition section 22 which provides for a gradual decrease in superficial vapor velocity and consequent increase in catalyst density. A highly fluidized, somewhat dense phase forms in the upper portion of transition section 22, near grid 24. Much more, but usually not all, of the coke combustion on catalyst occurs in the region 71 defined by transition section 22 and grid 24. A significant amount of backmixing may occur in region 71. Because of the geometry of region 71, some portions of it will exist as a fast fluidized bed, while portions near the top of riser 16 will be in generally dilute phase flow. Preferably an intense swirling action is created in transition region 71, such that incoming, high velocity dilute phase material from riser 16 entrains and/or aspirates the already vigorously fluidized catalyst/combustion gas mixture in region 71. There can even be a significant amount of catalyst settling near the walls of transition section 22, and this settled catalyst, actually a somewhat dense phase fluidized bed of material, will be efficiently refluxed into the transition region by the action of incoming high speed dilute phase material from riser 16. Preferably, the geometry, and the superficial vapor velocity, in transition region 71 are sufficient to maintain most of this region at least as a fast fluidized bed. Preferably the superficial velocities are somewhat above those needed for fast fluidized bed or turbulent fluidized beds, i.e., we use conditions which could not be maintained in conventional regenerators, in part because catalyst traffic in the dilute phase above the bed would be too great. The only way we can contain our intensely agitated transition region 71 is by immersing it in a dense bed, with a grid 24 to both support the bubbling or turbulent dense bed and contain the transition region 71.

The mixture of at least partially regenerated catalyst, remaining combustion air, $CO_2$ and, usually some $CO_2$ is discharged up through grid 24 into the dense bed of catalyst 81 maintained within the regenerator vessel 1, generally having the location 20 in the figure. The dense bed should completely envelope grid 24 and transition region 22. Dense bed 81 will usually be a bubbling or turbulent dense bed, such as is used conventionally in single fluidized bed catalyst regeneration means.

Some further coke combustion may, and preferably does occur in fluidized bed 81 within vessel 1. Combustion of carbon monoxide to CO2 is preferably completed within the fluidized bed 81. Flue gas discharged up from fluidized bed 81 enters dilute phase region 82, and passes through cyclone 30 to remove entrained catalyst. The flue gas, with reduced solids content, is discharged via cyclone separator vapor outlet 34 into plenum chamber 36 and flue gas outlet 40. Entrained catalyst, separated from flue gas, is discharged from cyclone 30 via dipleg 32 back into fluidized bed 81. A portion of the hot regenerated catalyst in fluidized bed 81 is recycled via recirculation catalyst line 44 and catalyst slide valve 46 and line 14 to riser mixer 16. Hot regenerated catalyst, for reuse in the FCC process, is withdrawn via line 26.

Plug Flow - Pure CSTR - Poor CSTR

In practice our design permits almost pure co-current flow, and almost a perfect CSTR to operate beneath a more conventional fluidized bed. An overview of what goes on in each of the three flow regimes will show this.

Plug Flow Zone

Riser mixing zone 16 preferably operates in fully developed plug flow. At a minimum the superficial vapor velocity should be enough to sustain pure dilute phase flow, such as those conventionally used in the dilute phase transport riser of high efficiency regenerators. Preferably even higher velocities are used, approaching those used in conventional riser reactors.

The plug flow regeneration causes rapid light off of coke combustion and may achieve a significant amount of CO afterburning. Much of the energy of the high velocity catalyst/gas mixture in the riser is then used productively to provide the motive force necessary to get a CSTR, discussed hereafter.

Pure CSTR

Transition region 71, above riser 16, provides a stage of regeneration which is very close to a Continuous Stirred Tank Reactor, CSTR. Bubbling bed conventional regenerators never get close to this—bubbling beds have large relatively stagnant regions and much of the combustion air bypasses the bed entirely, in the form of large bubbles. High efficiency regenerators, with fast fluidized bed coke combustors came much closer to the ideal of a continuous stirred tank reactor, but they are not perfect. The transition region 71 of the present invention probably is the closest approach to a perfect CSTR that can be achieved in a commercial unit.

Transition region 71 has no direct counterpart in known FCC regenerators Fast fluidized bed coke combustors come close, but they are not backmixed as much as transition region 71. Conventional high efficiency regenerators add most or all of the combustion air to the coke combustor rather than the riser mixer, if a riser mixer is used at all. It is highly unconventional to use the riser mixer to "drive" or agitate a CSTR, transition section 71. It is also unconventional to have a severely agitated fluidized bed immersed within another fluidized which is less agitated.

Poor CSTR

Catalyst regeneration is completed in a dense phase fluidized bed region 81. This less agitated fluidized bed will usually be a bubbling or turbulent dense bed, and will always be a much poorer CSTR than the transition region. The fluidized bed region 81 will still be plagued by bypassing, stagnancies, etc, but these faults of conventional dense phase fluidized beds can now be tolerated because essentially all of the fast coke is burned upstream of the conventional fluidized bed. Hydrogen-rich coke will never see localized high temperatures, because this "fast coke" is efficiently removed upstream of the bubbling dense bed. Localized high oxygen concentrations are greatly reduced in region 81, because most of the oxygen has been added and consumed upstream of bed 81, which will usually be bubbling dense bed.

Preferred operating conditions in each section of the regenerator of the present invention will now be discussed.

RISER MIXER—PLUG FLOW

The spent catalyst temperature will usually be in the range of 900–1050 F. The hot regenerated catalyst temperature will usually be in the range of 1200–1400 F. and preferably 1250–1350 F. The ratio of regenerated catalyst, in standpipe 14, to spent catalyst, in line 10, will usually be 3:1 or less, and preferably is around 1:1. The mix temperature, exclusive of any combustion which may occur, is usually 1100–1300 F., and preferably 1150–1200 F.

The amount of combustion air added should be equal to 30–100 % of the stoichiometric amount required to achieve complete combustion of all the coke on incoming catalyst to CO2.

The superficial vapor velocity in the riser mixer section will usually be 10–40 FPS, and preferably 20–30 FPS. The catalyst density in the riser mixer will usually be 3–10 lb./cu. ft., and preferably 5–7 lb./cu. ft.

TRANSITION REGION—PURE CSTR

Conditions in the transition region will usually be slightly more extreme, i.e., higher superficial vapor velocity and lower density, than those existing in conventional, fast fluidized bed coke combustors used in high efficiency regenerators. Conventional fast fluidized bed conditions will first be reviewed.

Conventional fast fluidized bed coke combustors operate at 1200–1350 F., and preferably 1250–1325 F. The superficial velocity is usually about 6 to 15 ft/sec, preferably 8 to 10 fps.

The catalyst density is usually be 8–25 lb/ft$^3$, and preferably around above 10 lb/ft$^3$. The amount of combustion occurring is usually 65–85% of the total.

In the "half coke combustor" embodiment, defined as transition section 71 in the FIG., conditions in the widest part, just under grid 24, will approach, or equal, those conditions used in conventional, fast fluidized bed coke combustors. On average, the conditions in the transition region 71 will be closer to dilute phase, i.e. the density in much of the region will be somewhat less, superficial vapor velocities slightly higher, etc. than those found in conventional coke combustors.

On average, the superficial vapor velocity in the transition region will be about 8 to 25 fps, and preferably about 10 to 20 fps. Densities will vary somewhat, ranging from densities perhaps as low as 3, 4 or 5 lb/ft$^3$ to a high of 10, 15 or 20 lbs per cubic foot. Depending on the angle of inverted cone element 22, some settling and de-aeration of catalyst can occur, especially in areas remote from riser 16. Although some settling can occur, the vigorous swirling and agitation which characterize region 71 will generally prevent formation of anything like a classical bubbling fluidized bed, with the possible exception of a small, laminar layer near the walls of inverted cone 22. At least 90%, and preferably 95 % of the volume in transition region 71 will have a catalyst density within the preferred ranges recited above, e.g., 90% of the region will have a density of 4 to 15 lb/ft$^3$.

2ND FLUIDIZED BED—POOR CSTR

Conditions in the second fluidized bed of regenerated catalyst can be conventional. This bed will be a bubbling dense bed, and these typically have low superficial vapor velocity, with operation possible with 0.1 fps vapor velocity. The superficial vapor velocity above grid 24 will largely be determined by the relative cross sectional areas of grid 24 and the cross sectional area of second bed 81. If the second dense bed has 3 times the area as grid 24, the superficial vapor velocity will drop, on average, by a factor of 3, with considerably local variation. All regions of the second fluidized bed should be aerated, and catalyst densities will usually exceed about 35 lb/ft$^3$. Some additional combustion air can be added to the second fluidized bed, but a majority of the combustion air, or other oxygen containing gas should be added via the riser 16.

Although the process tolerates conventional bubbling dense beds in this region, the invention can work even better if higher superficial vapor velocities are used, such that a more vigorous fluidized bed operation is achieved. Velocities sufficient to make the second fluidized bed a turbulent fluid bed, or even a fast fluidized bed can be used. The limiting factor will usually be the ability of cyclones or other catalyst recover means to recover catalyst from flue gas from the second fluidized bed, and the constraints presented by existing hardware. In most existing bubbling dense bed FCC regenerators it will not be possible to add enough air or other fluidizing gas to get out of the turbulent bed regime. Adding baffles, firebrick, or in some other way changing the regenerator geometry can be used if desired to increase the superficial vapor velocity, but such modifications will not usually be worth the cost, because the process of the present invention works well an inefficient turbulent dense bed.

PROCESS ADVANTAGES

There are several process advantages associated with the practice of the present invention. Some of the advantages were expected, i.e., a more efficiently fluidized dense bed, staged regeneration of catalyst, with reduced steaming or hydrothermal deactivation. Some of the benefits are unexpected, i.e., the potential to run with a relatively hot regenerator core (the transition region) and, if cooling coils not shown are provided in the second fluidized bed, a somewhat cooler shell. This means that older, bubbling dense bed regenerators, which may not have the metallurgy to handle 1350 F. bubbling dense bed temperatures, can be used. The high temperatures can be confined to some extent to the transition region, with lower temperatures being experienced in the bubbling dense bed region.

Because everything from the transition region 71 passes into the second fluidized bed 81, the unit accommodates operation with large amounts of excess air in the riser mixer and in transition region 71 without any danger of afterburning occurring. This is because the unreacted CO and O2 will enter bed 81 and have sufficient residence time therein to complete the combustion of CO. This permits operation of riser 16 and transition region 71 with unusually large amounts of O2 and CO exiting the riser, more than could be tolerated in conventional high efficiency regenerators.

REDUCED CATALYST RECYCLE

Immersing the transition region within a second fluidized bed permits some heating of spent catalyst by indirect heat exchange. Some heat transfer from hot regenerated to spent catalyst can occur by indirect heat exchange across the walls defining the upper portions of the mixer 16 and the coke combustor 50. This indirect heating will permit some reduction in the amount of hot, regenerated catalyst recycled via line 44 and 14 for direct contact heating of spent catalyst This is beneficial because the reduced catalyst reduces emissions of particulates, and saves energy. It takes energy to recycle tons of catalyst up and down 5-20 meters, and even slight reductions in catalyst recycle will save some energy. There will usually not be enough surface area available for heat transfer to eliminate catalyst recycle, but a reduction in catalyst recycle is helpful even if recycle can not be eliminated.

By including heat exchange means, not shown in the drawing, in fluidized bed 81, it will be possible to have a temperature in fluidized bed 81 which approaches or even drops below that of the transition region 71. This will allow low cost modification of existing single dense bed regenerators to more efficient regenerators in that much of the original regenerator vessel, hardware, etc., can be used.

In many instances, an external catalyst cooler, not shown, will be a preferred way of removing some heat from the catalyst in bed 81. A combination of internal and external heat exchange means may also be used. Heat removal from hot fluidized bed is well known in the art.

REDUCED CATALYST BLOWER DUTY

The practice of the present invention can save on the capital and operating expense of the blower supplying regeneration air, or can be used to increase the capacity of an existing regenerator. It may seem surprising that adding something to a bubbling bed regenerator (the transition region) and adding something below it (the riser) could reduce the blower duty, but the present invention can achieve this. The blower must supply enough air to burn coke from catalyst. Although the present invention is somewhat more efficient in this regard, only a minimal increase in capacity, perhaps 1 or 2%, is achieved because of the better regeneration. The present invention does not revoke the laws of stoichiometry, and roughly the same amount of air is needed to burn coke in a regenerator of the present invention as compared to a regenerator of the prior art. What the invention does achieve is a significant reduction in the pressure of the combustion air, or more precisely, a reduction in the pressure drop across the regenerator. The delta P across a bubbling bed regenerator and a regenerator of the present invention will be compared.

In a bubbling dense bed regenerator, all of the combustion air is customarily supplied to the base of the regenerator, via a forest of air tubes with holes drilled in the tubes. There is usually a 1-3 psi pressure drop across the air distributor, this large pressure drop is needed to keep all of the holes active A good percent of the attrition or destruction of FCC catalyst comes from high air nozzle velocities impinging on catalyst. The air must then pass through quite a deep (10-30 ') bed of dense phase fluidized catalyst. The catalyst behaves just like a liquid, and the pressure at the base of the regenerator is much higher than the pressure at the top of the regenerator. In many FCC regenerators, the dense phase fluidized bed material has a density of about 1, similar to water. For a 30' deep bed, roughly 15 psi is needed to add material to the base of the bed, rather than the top. If the regenerator operates at 15 psig (in the dilute phase region above the dense bed), then the pressure at the base of a thirty foot deep bed must be at least 30 psig (15 psig at the top, plus about 15 psi dP through the bed). To this must be added the differential pressure across the nozzles.

In a regenerator of the present invention, the high L/D ratio at the riser inlet, and the high traffic of catalyst and gas, allows use of a lower pressure drop air distributor. The riser tolerates well poor air distribution, whereas bubbling fluidized beds do not.

The regenerator of the present invention provides most of the combustion air to the riser, and the riser operates in dilute phase (i.e., low density) and the transition region operates in a turbulent or fast fluidized state (also characterized by a relatively low density, much lower than a bubbling dense bed). The only dense phase material the bulk of the regeneration gas has to get through is the relatively small amount of dense phase, or perhaps turbulent fluid bed phase, material sealing the transition region. This reduced density in the riser and in the transition region means that it is possible to reduce the dP to roughly 30-75% of the dP usually associated with single bed regenerators having the same cross sectional area, and regenerating the same amount of catalyst. A reduced pressure drop usually translates directly into increased air blower capacity, so that the coke burning capacity of the regenerator, and the capacity of blower limited FCC units, can be increased because the blower can supply more air if it can operate at a reduced pressure.

The regenerator process and apparatus of the present invention can be readily added to existing FCC single dense bed regenerators with minimal changes to the unit. Because of the small size and low profile of the transition region it can be included in many units which could not tolerate more extensive modification, e.g., immersing a full fledged, closed, coke combustor in the unit would have roughly twice the volume within the coke combustor, and would require additional catalyst/flue gas separation means at the outlet of the coke combustor. The present invention uses the conventional bubbling bed to seal the transition region, and thereby avoid half the volume of conventional coke combustors and eliminate catalyst/gas separation means on the coke combustor outlet.

We claim:

1. A three stage process for regenerating spent cracking catalyst containing nitrogen and hydrogen containing coke to produce regenerated catalyst comprising:

1) dilute phase, plug flow regeneration of spent catalyst by mixing it with a supply of hot regenerated catalyst to heat spent cracking catalyst by direct contact heat exchange and contacting said mixture in the base of a vertical riser with an oxygen or oxygen containing gas added in an amount sufficient to burn at least a majority of the coke on the spent cracking catalyst, and wherein the riser has a cross sectional area relative to gas and catalyst flow to generate a superficial vapor velocity in said riser sufficient to transport said mixture up said riser as a dilute phase to a riser outlet which discharges partially regenerated catalyst and oxygen containing flue gas;

2) regeneration of partially regenerated catalyst and oxygen containing flue gas discharged from said riser in an inverted cone coke combustor vessel having an inlet in a base thereof connective with said riser outlet and having a gas and catalyst permeable outlet at a top portion thereof, said permeable outlet having a cross sectional area at least twice that of said riser outlet so that the superficial vapor velocity of partially regenerated catalyst discharged from the riser outlet is reduced at least 50% at the permeable outlet of the coke combustor, and wherein the coke combustor has a volume sufficient to provide a residence time sufficient to burn at least a majority of the hydrogen and nitrogen compounds within the coke combustor to produce flue gas and partially regenerated catalyst which are discharged up through the permeable outlet of the coke combustor;

3) dense phase fluidized bed regeneration of partially regenerated catalyst from the coke combustor in a bubbling or turbulent dense phase fluidized bed maintained in a regenerated catalyst containment vessel containing said coke combustor permeable outlet and adapted to maintain said dense bed at a depth sufficient to cover said permeable outlet and completing in said dense bed the regeneration of said spent catalyst to produce hot regenerated catalyst which is recycled to said riser inlet to heat said spent catalyst and for recycle to a catalytic cracking reactor.

2. The process of claim 1 wherein essentially all of the oxygen or oxygen containing gas added, exclusive of fluffing air, is added to the dilute phase, plug flow riser.

3. The process of claim 1 wherein a majority of the hydrogen on spent catalyst is contained in fast coke representing poorly stripped or potentially strippable hydrocarbons, a majority of this fast coke is burned in the first stage riser and a majority of the coke and of the nitrogen and hydrogen on spent catalyst are burned in the second stage coke combustor and at least 10% of the coke is burned in the third stage dense bed.

4. The process of claim 1 wherein at least 90% of the nitrogen and hydrogen are burned in the riser and coke combustor and at least 15% of the coke is burned in the dense bed.

5. The process of claim 1 wherein the flue gas from the third stage dense bed contains NOx and emissions of NOx in the flue gas are decreased at least 50% by three stage regeneration as compared to NOx emissions produced by single stage regeneration of the same spent catalyst with the same amount of oxygen or oxygen containing gas in a single dense bed.

6. The process of claim 1 wherein the catalyst comprises 1 to 100 ppm of platinum metal or other combustion promoter with an activity equal to 1 to 100 ppm platinum on an elemental metal basis.

7. A process for regenerating spent cracking catalyst containing coke comprising nitrogen and hydrogen wherein oxygen or an oxygen containing gas is added and the coke is burned to form flue gas comprising CO2, NOx and H2O, and hot regenerated cracking catalyst which is recycled to a catalytic cracking process, comprising:

burning at least a majority of said coke in a vertical riser and an inverted cone coke combustor vessel immersed in a bubbling dense bed, and then completing regenerating of said catalyst in said bubbling dense bed, and wherein:

(a) said vertical riser has a cross sectional area, a lower inlet connective with a source of spent catalyst, a source of hot, regenerated catalyst, and a source of oxygen or oxygen containing gas; and an upper outlet in a base portion of the coke combustor vessel, and wherein a majority of the oxygen or oxygen containing gas during regeneration is added to said vertical riser;

(b) said coke combustor vessel has a lower inlet portion connective with said riser outlet and an upper portion comprising a catalyst and gas permeable outlet with an enlarged cross-sectional area relative to said riser, for discharge of catalyst and flue gas up through said permeable outlet into said bubbling dense bed; and (c) said regenerator vessel has an inlet in a lower portion thereof for a source of oxygen or oxygen containing gas, and said vessel contains said gas permeable coke combustor outlet and is adapted to maintain a bubbling dense phase fluidized bed of hot, regenerated catalyst at a depth sufficient to cover said gas permeable coke combustor outlet, and wherein no more than a minority of the oxygen or oxygen containing gas added during regeneration is added to said bubbling dense bed to produce regenerated catalyst in said bubbling dense bed in said regenerator vessel and recycling from said dense bed regenerated catalyst to said riser.

8. The process of claim 7 wherein said additional regeneration gas is added to said dense bed.

9. The process of claim 7 wherein said coke combustor is in the form of an inverted cone, with an inlet at the narrow base portion of the cone connective with said riser mixer and an outlet at the broadest, upper part of the cone, said outlet comprising a perforate area adapted to discharge upward a mixture of catalyst and flue gas.

* * * * *